Oct. 18, 1960 W. E. RUDISCH 2,956,657
CLUTCH
Filed Sept. 12, 1957
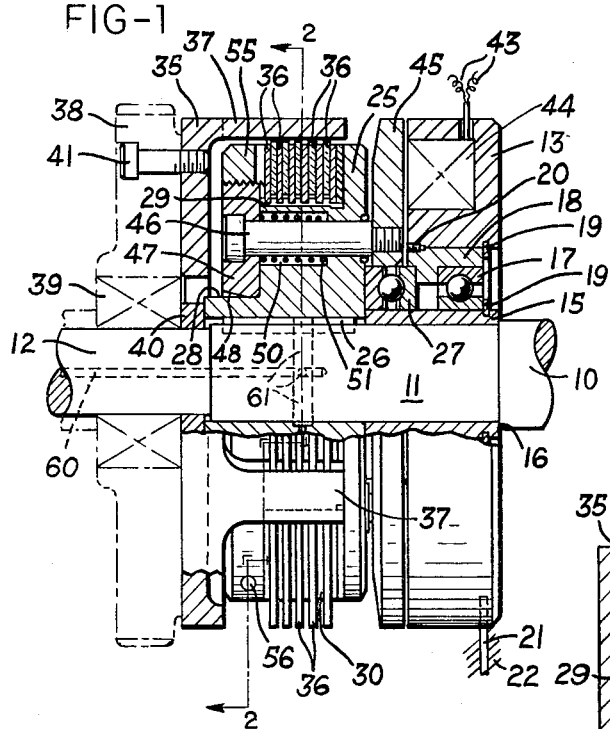
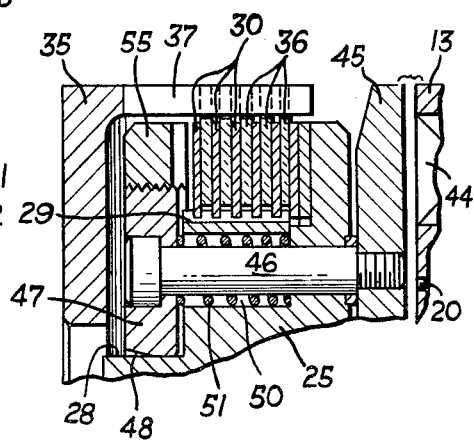
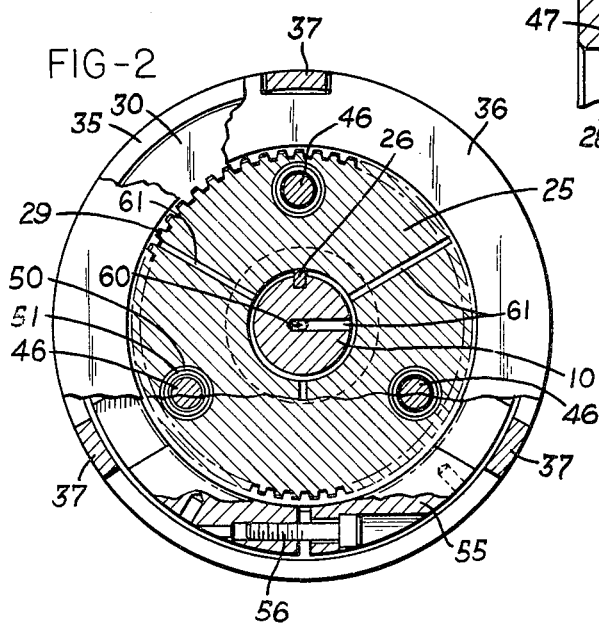
INVENTOR.
WALTER ERNST RUDISCH
BY
Marechal, Biebel, French & Bugg
ATTORNEYS

United States Patent Office 2,956,657
Patented Oct. 18, 1960

2,956,657

CLUTCH

Walter Ernst Rudisch, Dayton, Ohio, assignor, by mesne assignments, to The Bendix Corporation, a corporation of Delaware Filed Sept. 12, 1957, Ser. No. 683,524

2 Claims. (Cl. 192—84)

This invention relates to electromagnetic clutches and more particularly to a multiple friction disk clutch having a stationary magnetic field.

The relatively increased complexity of industrial machinery such as lathes, drill presses, grinders and milling machines, to name but a few, has resulted in widespread use of electromagnetic friction disk-type clutches to form connections between driving and driven parts. Such clutches are easily electrically controlled and operated and can therefore be actuated in a predetermined sequence, when desired.

In many present day electromagnetic clutches, the magnetic coil is carried by a rotating magnet body so that slip rings and brushes are necessary to supply it with electricity to create the magnetic field. The use of slip rings and brushes is acceptable in some instances whereas in others it is not. For example, where the clutch is completely immersed or covered with oil, which is an electrical insulator, a serious problem arises when attempting to supply the rotating coil with D.C. power from the stationary brush to the rotating slip ring. Also, if these magnetic flux lines pass through the friction disks, sufficient residual magnetism may result to maintain engagement of the disks after the coil is deenergized and thus to cause frictional heating of the disks. Thus the determination as to what frictional material would make the best disks for use in a disk stack will often be tempered by other considerations, such as heat, electrical conductivity and residual magnetism.

It is a principal object of this invention to provide a multiple disk-type magnetic clutch of novel structural and operational features having a stationary magnetic field and also characterized by simplicity of adjustment of the gap between the mating magnetic members.

Another object of this invention is to provide a multiple disk-type magnetic clutch as outlined above wherein the magnetic field is separated from the disk stack so that the stack will not be heated by flux lines passing therethrough.

Other objects and advantages of this invention will be apparent from the following description, the accompanying drawings and the appended claims.

In the drawings—

Fig. 1 is a cross sectional view through a multiple disk electromagnetic clutch according to the present invention;

Fig. 2 is a sectional view taken substantially along the line 2—2 of Fig. 1; and Fig. 3 is an enlarged fragmentary view over a portion of the clutch showing the armature and pressure plate assembly in their retracted positions to disengage the disks.

Referring to the drawing which illustrates a preferred embodiment of a clutch according to the present invention, a shaft 10 having portions 11 and 12 of reduced diameter is connected to a source of driving power (not shown). An annular magnet body 13 is freely mounted on shaft 10 by means of a sleeve 15 located adjacent the shoulder 16 formed at one end of reduced shaft portion 11 and carrying a radial bearing 17, the bearing 17 and bearing retainer 18 being held in position by snap rings 19 as shown. The magnet body 13 is shown as secured to the retainer 18 by a screw 20, and it is also held stationary in any convenient manner, indicated as a pin 21 set at opposite ends in body 13 and in the housing wherein the clutch operates, which is indicated fragmentarily at 22.

The first element of the clutch actually joined to the shaft 10 for rotation therewith is a first or inner body 25 which acts as the driving part of the clutch. Body 25 is retained in position by a key 26 and abuts the sleeve 15 and a thrust bearing 27 which is mounted on the sleeve in contact with retainer 18. The inner or driving body 25 includes a smooth lower shoulder 28 and a ribbed upper shoulder 29, the upper shoulder receiving a plurality of axially spaced friction disks 30 which extend radially outwardly from the body.

A second or outer body 35 surrounds a portion of shaft 10 adjacent inner body 25 but does not come into contact with the shaft. Body 35 is driven by body 25 through axially spaced friction disks 36 which interengage with disks 30 and are mounted on the axially extending finger-like extensions 37 of body 35. By permitting disks 36 to slide freely on extensions 37, self centering of these disks between the disks 30 is obtained while still achieving a positive rotary motion transmitting connection between the disks and the extensions 37. When the disks 30 and 36 are compressed, they form a disk stack which constitutes the releasable driving connection between bodies 25 and 35, the body 35 then being appropriately secured to the ultimate part to be driven. In Fig. 1 the gear 38 is shown as the part to be driven, and it is supported on shaft portion 12 by a bearing 39 which also cooperates with a spacer sleeve 40 to retain the body 25 axially in place against bushing 15. The body or spider 35 is secured directly to the driven member 38 as by bolts 41, and member 38 thus supports spider 35 in the desired concentric relation with the shaft.

Clutches utilizing friction disk stacks to effect driving connection have heretofore relied upon the passage of flux lines through the stack to draw them together or have required that the magnetic body rotate with the clutch so that the material making up the disks was not always the best material available from a frictional viewpoint. Undue heating of a disk stack can change the frictional characteristics of the disks making up the stack and can also result in accelerated wear, thereby increasing repair costs.

In the present clutch, the coil 44 developing the electromagnetic field is located within an appropriately formed recess in stationary magnet body 13 and is supplied with current through the input wires 43. The use of a stationary magnet, as generated by coil 44, is advantageous in eliminating brushes and slip rings which would otherwise be required to create a rotating magnetic field. An armature plate 45 is located in the space between magnet body 13 and inner body 25 for reciprocating movement toward and away from the coil 44. Movement of the armature plate accomplishes movement of force transmitting means including pins 46 and force transmitting plate 47, the pins being threaded onto armature plate 45 at one end and extending through inner body 25 as well as force plate 47. The force plate 47 is axially slidable on the smooth shoulder 28 of inner body 25 and has its contacting surface 48 slightly beveled to insure proper sliding action.

The inner body 25 has a recess 50 surrounding each pin 46 and containing a coil spring 51 which exerts an outward force against the surface of force plate 47 after it has been drawn in against the inner body 25 through movement of armature plate 45 toward coil 44. A pressure ring 55 is threaded onto the outer periphery of pressure plate 47 and locked in position by a locking screw 56 which extends tangentially into the pressure ring as shown in Fig. 2. It is through pressure ring 55 that the ultimate compressing force from the force transmitting means is directed against the side of the disk stack.

Since the length of axial travel of armature plate 45 is comparatively slight, the correct effective length of force pins 46 must be determined prior to assembly of the clutch to insure that pressure ring 55 will press against the friction disks 37 when the armature plate is drawn toward coil 44. If the pressure ring 55 is advanced axially toward the friction disks with respect to force plate 47, the gap between the magnet body 13 and the armature plate 45 will be increased due to relative movement of plate 47 away from inner body 25 with consequent movement of force pins 46. The pressure acting against the disk stack is decreased as a result of the decreased magnetic attraction.

Additionally, relative adjustability of pressure ring 55 permits compensation for decreasing thickness of the friction disks 30, 36 resulting from wear. Continued wear of the disks permits armature plate 45 to approach magnet body 13 more closely, through the various linking parts, so that pins 46 are of lengths insuring contact between plate 47 and body 25 prior to contact between the armature plate and the magnet body. Thus the rotating armature plate 45 is always held out of contact with the nonrotating magnet body 13 since the axial clearance between the pressure plate 47 and the inner body 25 is less than the running clearance between the armature 45 and the magnet body 13.

While the disk stack is a sufficient axial distance from the coil 44 to minimize the passage of flux lines through the disk stack, some heating occurs owing to the frictional engagement of disks 30, 36, and such frictional heat is dissipated by an axial bore 60 which extends longitudinally through the shaft 10.

A plurality of radial outlet bores 61 in the shaft 10 and inner body 25 enable the flow of cooling oil through bores 60 and 61 onto the inner side of the disk stack so that it must flow outwardly through and around the stack to escape, and in so flowing, the oil will carry away frictional heat resulting from contact of the disks 30 and 36. Thus, where the clutch is submerged in oil, as would be the case in many machine tools, it is possible to cool the stack continuously so that the frictional characteristics of the cooperating disks remain at substantially full values.

While the form of apparatus herein described constitutes a preferred embodiment of this invention, it is to be understood that this invention is not limited to this precise form of apparatus and that changes may be made therein without departing from the scope of the invention which is defined in the appended claims.

What is claimed is:

1. An electromagnetic clutch for forming a releasable connection between a driving shaft and a driven member, comprising a stationary magnet body incorporating an electromagnet for creating a magnetic field, a driving clutch body adapted to be secured to said driving shaft in axially spaced relation with said magnet body and having thereon a plurality of outwardly extending friction disks, a driven clutch body having thereon a plurality of inwardly extending friction disks interfitting with said disks on said driving body to form a friction disk stack spaced from said magnet body, means for attaching said driven body to said driven member, an armature plate located between said magnet body and said driving body for axial movement toward said magnet body upon energizing thereof, a force plate mounted for axial movement on the opposite side of said driving body from said armature plate, force transmitting pins extending reciprocably through said driving body and secured at one end to said armature plate to support said armature plate for said axial movement thereof and connected to said force plate at the other end to draw said force plate toward said stack upon energizing of said magnet body, means for biasing said force plate away from said stack upon deenergizing of said magnet body, a pressure ring carried by said force plate and including an end face for engagement with said stack compressing said stack and limiting said movement of said force plate toward said magnet body, and means forming an axially adjustable connection between said pressure ring and said force plate providing for relative adjustment thereof to establish a running clearance between said armature plate and said magnet body.

2. An electromagnetic clutch for forming a releasable connection between a driving shaft and a driven member, comprising a stationary magnet body incorporating an electromagnet for creating a magnetic field, a driving clutch body adapted to be secured to said driving shaft in axially spaced relation with said magnet body and having thereon a plurality of outwardly extending friction disks, a driven clutch body having thereon a plurality of inwardly extending friction disks interfitting with said disks on said driving body to form a friction disk stack spaced from said magnet body, means for attaching said driven body to said driven member, an armature plate located between said magnet body and said driving body for axial movement toward said magnet body upon energizing thereof, a force plate mounted for axial movement on the opposite side of said driving body from said armature plate, force transmitting pins extending reciprocably through said driving body and secured at one end to said armature plate to support said armature plate for said axial movement thereof and connected to said force plate at the other end to draw said force plate toward said stack upon energizing of said magnet body, means for biasing said force plate away from said stack upon deenergizing of said magnet body, a pressure ring carried by said force plate and including an end face for engagement with said stack compressing said stack and limiting said movement of said force plate toward said magnet body, means forming a threaded connection between said pressure ring and said force plate providing for relative axial adjustment thereof and thereby establishing a running clearance between said armature plate and said magnet body, and means for releasably securing said pressure ring and said force plate together in selected adjusted relation.

References Cited in the file of this patent
UNITED STATES PATENTS

| Re. 19,150 | Furnas | May 1, 1954 |
| 1,622,939 | Bing | Mar. 29, 1927 |
| 1,746,365 | Schuenmann | Feb. 11, 1930 |
| 1,928,301 | Pierson | Sept. 26, 1933 |
| 2,466,262 | Myers | Apr. 5, 1949 |
| 2,692,035 | Rabinow | Oct. 19, 1954 |
| 2,775,328 | Yokel | Dec. 25, 1956 |
| 2,847,102 | Tiedeman et al. | Aug. 12, 1958 |

FOREIGN PATENTS

| 387,487 | Germany | Dec. 28, 1923 |
| 162,474 | Austria | Mar. 10, 1949 |
| M19068 | Germany | June 28, 1956 |